United States Patent [19]

Jordan

[11] 4,137,881

[45] Feb. 6, 1979

[54] APPARATUS USING EXHAUST GAS FOR FUEL VAPORIZATION

[76] Inventor: Wilmer C. Jordan, 3915 W. Wrightwood, Chicago, Ill. 60647

[21] Appl. No.: 847,949

[22] Filed: Nov. 2, 1977

Related U.S. Application Data

[63] Continuation-in-part of Ser. No. 680,295, Apr. 26, 1976, abandoned, which is a continuation of Ser. No. 480,849, Jul. 19, 1974, abandoned, which is a continuation-in-part of Ser. No. 378,836, Jul. 13, 1973, abandoned.

[51] Int. Cl.$^2$ ............................................. F02M 31/00
[52] U.S. Cl. .............................. 123/122 AA; 261/144; 261/145
[58] Field of Search ............ 123/122 AA, 122 R, 141; 261/145; 165/52

[56] References Cited

U.S. PATENT DOCUMENTS

| | | | |
|---|---|---|---|
| 1,128,998 | 2/1915 | Mulvaney | 123/122 AA |
| 1,373,290 | 3/1921 | Beruet | 123/122 AA |
| 3,042,016 | 7/1962 | Christian | 123/122 AA |

*Primary Examiner*—Ronald H. Lazarus
*Attorney, Agent, or Firm*—Thomas R. Vigil

[57] ABSTRACT

The apparatus includes tubular heating elements positioned in carburetor air-fuel paths. Each element has a flow passage therethrough connected to input and exhaust conduits which together define a path for flow of exhaust gases from the engine exhaust manifold to the atmosphere. The inlet flow path and the outlet flow path have flow constricting zones having predetermined areas. These flow constricting zones, as well as the size and configuration of the elements making up the flow path are so proportioned to the size of the engine as to obtain optimum performance with respect to economy and torque or horsepower output. The tubular elements are supported in a plate between the carburetor and the intake manifold in a manner such as to heat the fuel to an optimum extent while minimizing heating of the air of the air-fuel mixture.

23 Claims, 6 Drawing Figures

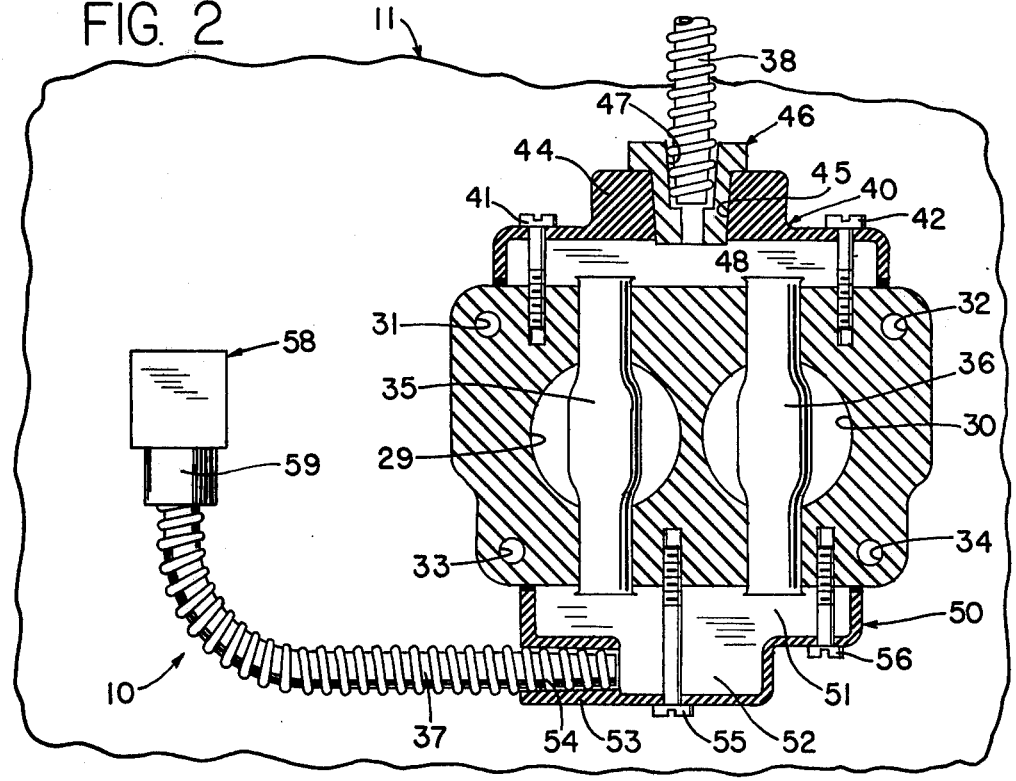
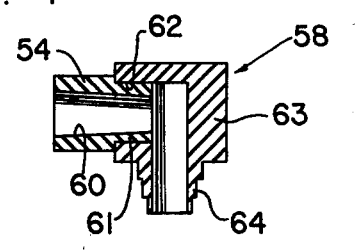

APPARATUS USING EXHAUST GAS FOR FUEL VAPORIZATION

CROSS REFERENCE TO RELATED APPLICATIONS

This application is a continuation-in-part of application Ser. No. 680,295, filed Apr. 26, 1976, now abandoned which is a continuation of application Ser. No. 480,849, filed June 19, 1974, now abandoned, which is a continuation-in-part of application Ser. No. 378,836, filed July 13, 1973, now abandoned. Another related application Ser. No. 615,385, now U.S. Pat. No. 3,985,112, which is a continuation of application Ser. No. 378,836, now abandoned.

BACKGROUND OF THE INVENTION

1. Field of the Invention

The present invention relates to apparatus for vaporizing fuel droplets undergoing carburation. More specifically, the present invention relates to such an apparatus which utilizes heat from engine exhaust gases to vaporize the fuel.

2. Description of the Prior Art

Heretofore various methods and apparatus for fuel vaporization in internal combustion engines have been proposed, and several examples of such apparatus utilizing electric heating devices are disclosed in the following patents:

U.S. Pat. No. 3,556,065 issued Jan. 19, 1971 and U.S. Pat. No. 3,760,780, issued Sept. 25, 1973.

As disclosed in U.S. Pat. No. 3,556,065 it is found that optimum performance of an engine can be achieved by using electric heating devices to supply a certain amount of radiant heat into an air-fuel mixture, effective to cause the engine to develop maximum torque and acceleration while operating within normal ranges of load, speed and ambient temperature conditions and with the throttle valve of the engine fully opened, average torque and acceleration being reduced in proportion to a reduction in the amount of heat below the optimum amount and being also reduced in proportion to an increase in the amount of radiant heat above the optimum amount.

The electric heating devices disclosed in the prior patents are highly advantageous and in addition to producing a marked increase in torque and acceleration, such devices also produce, at the same time, an increase in efficiency. A great many tests have been conducted showing very substantial increases in gas mileage. Such devices do, however, require a substantial amount of electrical power which may, for example, be on the order of 55 watts for an engine having a displacement of 240 cubic inches, the required power being correspondingly lower or higher for smaller or larger engines. Also, considerable care must be exercised in constructing the electric heating elements of the devices to obtain reliable operation and long life.

In U.S. Pat. No. 3,985,112, issued on the application from which this application claims priority there is disclosed the use of a high temperature fluid flowing through an internal flow passage of a heater device to heat the heater device and to cause radiation of heat from the external surface thereof into fuel for vaporization thereof. The high temperature fluid is preferably engine exhaust gas which has very important advantages in that exhaust gas is conveniently available and also in that it provides a source of sufficient energy to produce a high enough temperature for radiation of an amount of heat into the fuel-air mixture approximately equal to that required for optimum performance. As further disclosed in U.S. Pat. No. 3,985,112 the supply of the high temperature fluid is controlled to maintain the exterior surface of the heating means at a certain temperature which may be changed in response to ambient temperature, the supply of the high temperature fluid being controllable through electrically operated valves, electrical signal generating temperature sensing means and electrical circuitry.

In the prior art, a number of apparatus using various forms of heating means in conjunction with carburetors and intake manifolds of internal combustion engines have been proposed. It is not known whether such apparatus have ever been actually used to obtain improved results and it is not readily apparent that any of the previously proposed apparatus would be operative to produce a significant improvement in performance of an engine during normal operating conditions. Although referring to temperature and heat control, the teachings of the prior art apparatus do not suggest or teach the amount of heat or the temperatures to be used or the control thereof to obtain optimum engine operation. Moreover, the previously proposed apparatus have been such that it would be difficult if not impossible to obtain temperatures and amounts of heat which provide optimum engine operation.

Included in the prior art are apparatus for heating the air or fuel prior to entry into a carburetor which may have advantages under certain conditions such as in cold weather starting or in warming up an engine, or when icy conditions exist, but which have severe disadvantages from the standpoint of engine performance in normal operating conditions. It is also quite common to apply exhaust heat to an intake manifold wall which is apparently advantageous during warming up of an engine but which is disadvantageous with respect to performance and normal operating conditions.

Also in the prior art literature there has been proposed a system which uses a vaporizer heated from exhaust manifold heat through a heat exchange liquid. It appears that such system would not be able to supply sufficient heat to the fuel at the proper temperature without undue heating of the air. The system also appears quite complicated with respect to construction, installation and operation and it appears that the flow of the air-fuel mixture might be unduly restricted.

Examples of previously proposed apparatus and methods of the types described above are disclosed in the following patents:

U.S. Patent Nos.

1,128,998
1,133,845
1,258,910
1,300,630
1,321,079
1,536,299
1,706,242
3,042,016
3,053,242
Canadian Patent No.—679,673
Italian Patent No.—495,411
French Patent No.—499,893
French Patent No.—822,241
French Patent No.—965,760

In U.S. Pat. No. 3,042,016 there is disclosed a gas vaporizer attachment for an I.C. engine which includes an adapter plate with apertures which mate with carburetor parts and a tubing having one end connected to the engine exhaust manifold and a U-shaped section thereof which is mounted in the plate with the bight portion of the U being disposed in one aperture and portions of each leg extending across the other aperture. As will be described in greater detail hereinafter, the apparatus of the present invention differs from this gas vaporizer by providing a tubing which extends across each aperture along a diameter thereby to be located in the center of the fuel path and by providing specific parameter ranges for the thickness of the tubing portions in the apertures transverse to the fuel path and for the inlet and outlet openings of inlet and exhaust gas flow connections to the tubings thereby to control, and provide for, temperature and heat input values which provide optimum engine operation.

SUMMARY OF THE INVENTION

According to the invention there is provided for use with a carburetor of an internal combustion engine having at least two generally circular barrels, an apparatus for vaporizing fuel in an air-fuel mixture, said apparatus comprising, a plate adapted to be mounted between a carburetor and openings in the intake manifold of the engine, said plate having at least two passages which mate with and align with the barrels of the carburetor and the manifold openings, heating means for heating fuel flowing through said passages, insulating means between said plate and the carburetor, said heating means including two tubular elements, each element extending across one of said passages generally along a diameter of the said passage and transverse to the axis of rotation of a butterfly throttle valve of the carburetor, each said element having a predetermined width transverse to the flow of fuel and air, inlet flow control means coupled to respective first ends of said elements, outlet flow control means coupled to respective second ends of said elements and venting to atmosphere, said inlet flow control means having a first gas flow constricting orifice of predetermined area, said outlet flow control means having a second gas flow constricting orifice of predetermined area less than the area of said first constricting orifice, and the construction, arrangement and dimensions of said elements, said first orifice and said second orifice providing for efficient and effective vaporization of the fuel with minimal heating of the air.

BRIEF DESCRIPTION OF THE DRAWINGS

FIG. 2 is a sectional view taken substantially along line 2—2 of FIG. 1;

FIG. 4 is a sectional view of a fitting used in the apparatus;

DESCRIPTION OF THE PREFERRED EMBODIMENTS

Figure 1:
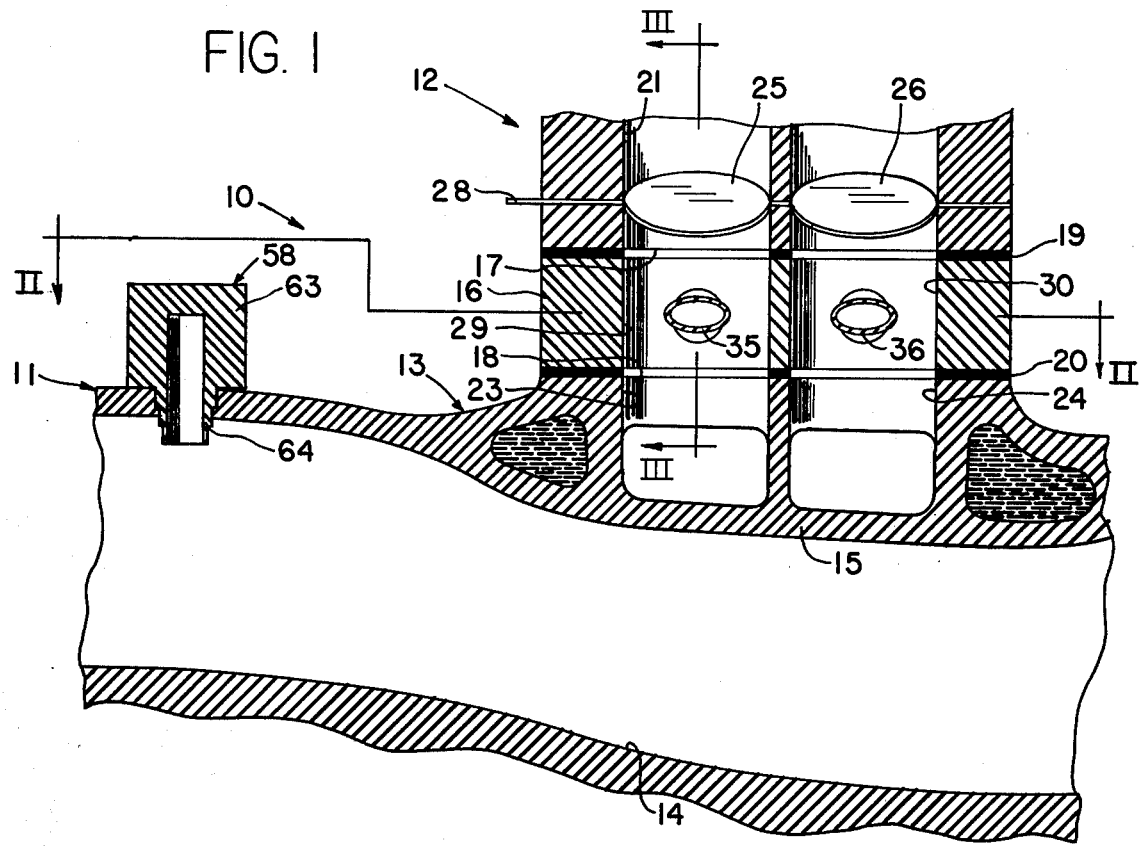
FIG. 1 is a cross sectional view of a portion of an engine incorporating apparatus according to the teachings and principles of the present invention, the section being taken in a vertical plane transverse to the axis of the engine crankshaft and in the center of the engine carburetor.

Reference numeral 10 generally designates apparatus constructed in accordance with the teachings and principles of the present invention, shown installed on an engine 11 having a carburetor 12, an intake manifold 13 and a cross-over passage 14 extending under a bottom wall 15 of the intake manifold 13, the engine being a V-type engine having two exhaust manifolds interconnected by the cross-over passage 14.

The apparatus 10 comprises a plate 16 mounted between a lower mounting surface 17 out of the carburetor 12 and an upper surface 18 of the intake manifold 13 with gaskets 19 and 20 being sandwiched between surfaces 17 and 18 and the upper and lower surfaces of the plate 16. The illustrated carburetor 12 is a two barrel carburetor having two parallel flow passages 21 and 22 aligned with passages 23 and 24 of the intake manifold 13, a pair of butterfly throttle valves 25 and 26 being supported in the passages 21 and 22 by means of a common shaft 28. The passages 21–24 are typically circular as shown. Plate 16 has through passages 29 and 30 for flow of mixed air and fuel from the carburetor passages 21 and 22 to the intake manifold passages 23 and 24. Passages 29 and 30 need not be separate and may be a single passage but it is preferred that there be two separate passages as shown. Mounting holes 31–34 are provided in the plate 16 for passage of carburetor mounting bolts through the plate 16.

Apparatus 10 further includes a pair of heating elements 35 and 36 extending in parallel relation to each other across the passages 29 and 30 of plate 16, elements 35 and 36 being in the form of hollow tubes heated by exhaust gas flowing therethrough. In the illustrated arrangement, exhaust gas flows from the cross-over passage 14 through a conduit 37 into the rearward ends of the elements 35 and 36 and flows from the forward ends of the elements 35 and 36 into a conduit 38 and thence to the atmosphere.

Figure 3:
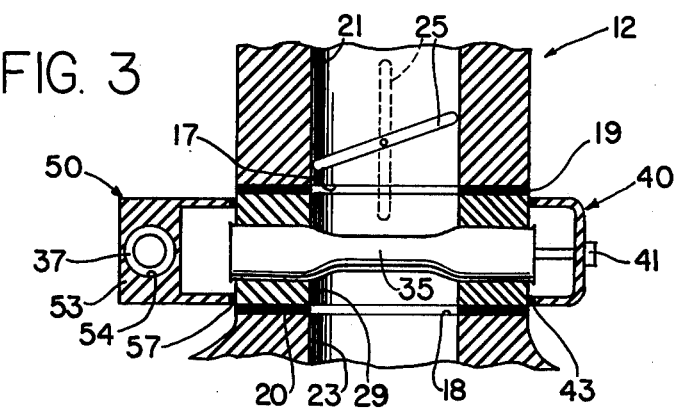
FIG. 3 is a sectional view taken substantially along line 3—3 of FIG. 1.

In manufacture, the elements 35 and 36 are preferably formed by cylindrical tubes which are inserted into holes cast or otherwise formed in the plate 16 after which a tool is inserted into each end of each tube to expand the tube into tight sealing engagement with the inner surfaces of such holes and to provide flared ends as illustrated, securely locking the elements 35 and 36 in place. Central portions of such tubes, in the passages 29 and 30 can then be formed into generally elliptical cross-sectional shapes as shown in FIG. 1, for the purpose of providing clearance for movement of the throttle valves 25 and 26 into fully open positions while minimizing the required thickness of the plate 16 and for the purpose of providing a desired width of the element which is determined empirically as described below. This feature is depicted in FIG. 3 in which the throttle valve 25 is shown in full lines in its closed position and in broken lines in its fully open position.

A cap member 40 is provided for coupling the conduit 38 to the forward ends of the elements 35 and 36, the cap member 40 being generally cup-shaped and defining a chamber which extends sidewardly beyond the forward ends of both elements 35 and 36. The cap member 40 is secured to the forward face of plate 16 by screws 41 and 42 with a gasket 43 being disposed between the rim of the member 40 and the forward face of the plate 16. Cap member 40 has a central relatively thick forward wall portion 44 which has an opening 45 therethrough into which a tapered end portion of a fitting 46 is inserted. Fitting 46 has an opening therethrough including an outer tapered portion 47 receiving one end of the conduit 38 and an inner portion 48 between the end of conduit 38 and the chamber defined by the cap member 40. The portion 48 can be referred to as an outlet defining orifice or simply outlet orifice 48. The conduit 38 is preferably a flexible conduit and most preferably is of aluminum and of the type used as an outer sheath of "BX" electrical cables. It serves as an excellent muffler, greatly reducing sounds produced by the pulsating flow of exhaust gases.

Another cap member 50 is provided for coupling an end portion of the conduit 37 having an orifice 37a to the rearward ends of the elements 35 and 36. Orifice 37a can be referred to as an inlet defining orifice or simply inlet orifice 37a. Cap member 50 is similar to the cap member 40 except that it defines a chamber having two portions, a forward portion 51 extending beyond the rearward end portion of elements 35 and 36 and a narrower rearward portion 52, and except that it has a relatively thick wall portion 53 on one side having a tapered opening 54 receiving the end of conduit 37 which is preferably a flexible conduit of stainless steel capable of withstanding exhaust gas pressure without leakage. The exhaust gases flow from the conduit 37 into the rear chamber portion 52 and thence into chamber portion 51 and thence in substantially equal proportions into the ends of elements 35 and 36. Cap member 50 is secured to the plate 16 by screws 55 and 56, a gasket 57 being provided between the rim of the member 50 and the rear face of plate 16.

A fitting 58 is provided for connecting the other end of conduit 37 to the cross-over manifold passage 14. As shown in FIG. 4, fitting 58 includes a cylindrical portion 59 having a tapered inside surface 60 for receiving the end of conduit 37 and having a reduced diameter end portion 61 press-fitted into an opening 62 in a second part 63 which has a lower integral sleeve portion 64. The outer surface of sleeve portion 64 is stepped with a lower portion of small diameter, an intermediate portion of somewhat greater diameter and an upper portion of still greater diameter. The purpose of this feature is to allow the portion 44 to be pressed with a seal fit into a hole drilled in the upper wall of cross-over passage while accommodating variations in the size of such hole. Thus if the hole drilled has a diameter greater than that of the lower portion of sleeve portion 64, a tight fit can still be obtained when the intermediate or upper portions of the sleeve portion 64 is pressed into the hole. Fitting 58 is preferably of aluminum or other relatively soft material.

Figure 5:
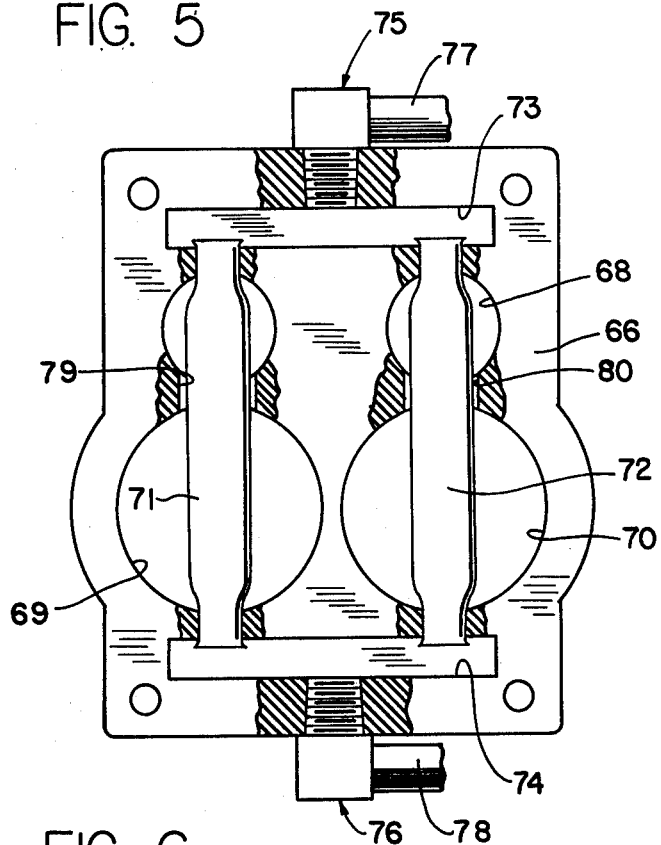
FIG. 5 is a bottom plan view of a modified construction according to the teachings and principles of the present invention.

FIG. 5 illustrates a modified type of construction which as illustrated is designed for a four barrel carburetor and which includes a plate 66 having two passages 67 and 68 for passage of mixed air and fuel from the "primary" passages of the four barrel carburetor and having two additional passages 69 and 70 for flow from the "secondary" passages of the four barrel carburetor. Two heating elements 71 and 72 are provided. Element 71 extends through passages 67 and 69 while element 72 extends through the passages 68 and 70. The type of construction shown in FIG. 5 does not use end cap member such as members 40 and 50 of the arrangement of FIGS. 1–4. Instead, the plate 66 is formed with two slots 73 and 74 extending from the lower face of the plate 66 part way toward the upper face thereof and in transverse relation to the parallel axes of the elements 71 and 72, the slot 73 defining a chamber communicating with the forward ends of the elements 71 and 72 and the slot 74 defining a chamber communicating with the rearward ends of the elements 71 and 72. Conventional type couplings 75 and 76 having inlet and outlet orifices 75a and 76a, respectively, are connected to conduits 77 and 78 and are threaded into the forward and rearward ends of the plate 66 to establish communication between conduits 77 and 78 and the slots 73 and 74 and thus the forward and rearward ends of the elements 71 and 72.

Plate 66 is preferably formed with slots 79 between the primary passages 67 and 68 in the secondary passages 69 and 70 to provide clearance spaces around the elements 71 and 72 and to provide for additional flow of mixed air and fuel therearound.

In construction, the plate 66 may preferably be cast with the elements 71 and 72 in plae in a mold and the central portions of the elements 71 and 72 may either be pre-formed with an elliptical cross-sectional shape or formed into an elliptical cross-sectional shape after the casting operation. Alternatively, the plate may be cast with or drilled after casting to form insertion openings extending to at least one of the ends thereof to permit insertion of round tubes into the plate, after which the elements are shaped as illustrated, the insertion openings being then plugged.

A unit for a four barrel carburetor may of course be formed with end cap members such as the members 40 and 50 of the arrangement of FIGS. 1–4, with two heater elements each extending through one primary and one secondary passage in the manner as depicted in FIG. 5. Also, a unit for a two barrel carburetor may be formed with slots similar to the slots 73 and 74 of the arrangement of FIG. 5.

It is important that in all constructions, the hot exhaust gases should be supplied from the end of the unit closest to the opening side of the throttle valve, i.e., the side of the throttle valve which during movement of the throttle valve from its closed position to its fully open position moves downwardly or in the direction of flow. This insures that the heat will be applied with maximum effectiveness. With the throttle valve slightly open, for example, the fuel droplets in the mixture will impinge upon or pass in close proximity to the hottest part of the heating element.

In conventional V-type engines, the opening side of the throttle valve is to the rear and with a two barrel carburetor as shown in FIGS. 1–4, the hot exhaust gases are supplied into the rearward end of the plate. In the case of a four barrel carburetor, the opening sides of the throttle valve is to the rear but since the primary passages are always in operation with the secondary passages being generally used only for rapid acceleration, and since the opening sides of the primary passages are closest to the forward end of the plate, the hot exhaust gases are preferably supplied to the forward end of the plate. Thus in the arrangement of FIG. 5, the conduit 77 is coupled to the exhaust manifold or to the cross-over passage and the free end of the conduit 78 is open to the atmosphere.

It is further noted that the transmission of the exhaust gases to the heater elements from the cross-over passage of a V-type engine is highly advantageous in that the conduits can be as short as possible and in that the connections can be made quickly and easily. However, the connection could be made to one of the exhaust manifolds and in this connection, it is noted that with the use of the arrangement of this invention, it is possible that the cross-over passage might be either plugged or eliminated during engine manufacture, in which case the connection would of course be made to the exhaust manifold. Elimination of the cross-over passage would be desirable to minimize heating of the air during normal engine operation.

Figure 6:
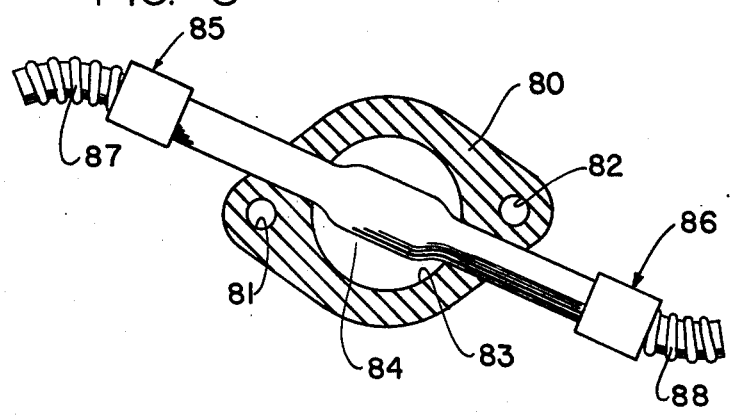
FIG. 6 is a top plan view of another modified construction according to the teachings and principles of the present invention.

FIG. 6 illustrates another modification designed for single barrel carburetors including a plate 80 having mounting holes 81 and 82 and having a passage 83 therethrough for flow of the air-fuel mixture from the engine carburetor into the intake manifold. A heating element 84 is provided extending through the passage 85 and having opposite ends projecting from the plate 80 and connected through fittings 85 and 86 to flexible conduits 87 and 88. In conventional single barrel carburetors, the axis of the throttle valve is parallel to the crankshaft axis, in a plane transverse to a plane through the mounting holes and the opening side of the throttle valve is to the left looking from the driver's position behind the engine. In order to position the hot side of the heating element as close as possible to the opening side of the throttle valve and still clear the mounting holes 81 and 82, the element 84 is positioned angularly as shown, spaced a short clearance distance ahead of hole 81 and a short clearance distance behind hole 82. Conduit 87 is connected to the exhaust manifold by a suitable fitting such as the fitting 58 of FIG. 4, while the conduit 88 has a free end open to the atmosphere. The direction to the exhaust manifold may preferably be made adjacent the number one cylinder, although it could be made into other positions. Like the other illustrated heating elements, the element 84 preferably has a central section of generally elliptical cross-sectional shape for clearing the throttle valve while minimizing the required thickness of the plate 80.

It is noted that in each of the illustrated constructions, the heating elements are disposed in a central portion of the path of flow of the fuel-air mixture coming from the region in the carburetor in which fuel droplets are drawn into the air, i.e., generally on a diameter of the carburetor passage. The fuel droplets either contact the outer surface of the heating element to receive heat therefrom by direct conduction or pass in close proximity thereto to receive heat by radiation. There is thus efficient transfer of heat to the fuel droplets, it being noted that the amount of heat energy transmitted by radiation is generally a function of the inverse square of the distance from a radiating surface and hence the close proximity to the droplets not directly contacted is highly important.

There is, of course, some heating of the air but it is minimized because the heat is absorbed more readily by the liquid fuel droplets and air itself is not a good heat absorber or conductor.

Thus the arrangement maximizes the transmission of heat to the fuel droplets while minimizing the transfer of heat to the air. This is very important in that it is desirable to vaporize the fuel to a certain extent to insure rapid and efficient combustion of the mixture after it reaches the cylinder and is compressed therein, but it is desirable, at the same time, to minimize heating of the air. Heating of the air reduces its density and reduces the amount of oxygen taken in in an intake stroke to be available for compression in the compression stroke and combustion in the following power stroke. As a result, the torque and horsepower of the engine are reduced by heating of the air. It is for this reason that heating of the air prior to entry into the carburetor is undesirable from the standpoint of the normal engine operation. It is also not desirable from the standpoint of normal operation to heat the carburetor or to heat the intake manifold, although such may have limited advantages in connection with avoiding carburetor icing or in reducing the time required to warm up an engine. Heat applied to the wall of the mixed air-fuel path is primarily effective to heat the air rather than to vaporize the fuel since most of the fuel does not come into direct contact with or into close proximity to the walls and thus can receive heat only from the air.

In each of the illustrated constructions, the heating element is preferably of a material such as stainless steel having the ability to retain heat and to operate at a relatively stable temperature, while the support plate is preferably of aluminum which is a good heat conductor. It is noted that the plate in each case is sandwiched between gaskets which are good heat insulators.

The amount of heat required for optimum performance varies in proportion to the rate of flow of fuel into the air-fuel mixing region of the engine carburetor which, in turn, varies in proportion to the rate of flow of air into the carburetor, the rate of flow of air being proportional to the speed of engine rotation and the degree of opening of the throttle valve. The peak pressure developed at a given point in the exhaust system varies in proportion to the amount of mixed air and fuel burned during each power stroke and the average or mean pressure varies in proportion to the product of speed (number of power strokes per unit time) and the amount of mixed air and fuel burned during each power stroke. With exhaust gas being supplied to one end of the flow path and with the other end thereof being open to the atmosphere, the flow therethrough is proportional to the average or mean pressure which in turn is proportional to the rate of the taking in and burning of mixed air and fuel. Thus, there is an automatic proportioning of heat in accordance with speed-load operating conditions.

It is noted that the flow of a fluid through any given flow path is not generally proportional to applied pressure according to a linear function and also that the amount of heat radiated into the fuel is probably not a linear function of exhaust gas flow. It is believed, however, that to the extent that there are such non-linearities, it is desirable rather than undesirable. For example, it appears that more heat is applied per unit volume of mixed air and fuel when the engine is operated at idle or low-load conditions, resulting in a higher temperature of the heating means. This is highly desirable in insuring sufficient vaporization for complete fuel combustion and in preventing formation of carbon deposits, a serious problem in engines operated for long periods of time at idle and low speed and load conditions, especially in engines equipped with conventional anti-pollution equipment. The higher temperature may result in substantial heating of the air, but during idle or low load conditions, heating of the air is not necessarily disadvantageous. Generally, it is only at high torque or high speeds that it is important to minimize heating of the air.

In connection with pollution, it is noted that tests indicate that the apparatus of this invention greatly reduces carbon monoxide and hydrocarbons in the exhaust of the engine, both at idle and at higher speeds. Tests have not been made with respect to nitrous oxides but based on experience in testing of units having electrically heated heating means, it is believed that the apparatus 10 produces very significant reduction in nitrous oxides.

It is very important that the amount of heat be proportioned to the size of the engine for obtaining the proper temperature of the heating elements and to transfer the proper amount of heat to the fuel droplets. Changes in the sizes of the heating elements and changes in the size and configuration of the path of flow of exhaust gas have a pronounced effect on performance, reducing engine performance if they produce either too much heat or too little heat. As a practical matter, the relationships required are best defined by setting forth specific examples of the constructions and dimensions of the apparatus 10 for particular engines, forming guide lines for constructions of the apparatus 10 for engines differing from those described in the examples. These examples are of early prototype constructions of the apparatus 10 and following the examples is set forth a description of "rule of thumb" relationships developed after further extensive testing. In any event, the following examples are examples of early constructions of the apparatus 10 for obtaining close to optimum results from the standpoint of both improved fuel economy and increased torque and horsepower:

EXAMPLE I.

For a General Motors V-eight engine having a cubic inch displacement of from 350–400 cubic inches and a two barrel carburetor (such as engines manufactured from 1961 or 1962 through 1974) an embodiment of apparatus 10 having an aluminum plate and having a configuration such as that of the plate 16 shown in FIGS. 1–4 was utilized, the passages being approximately 1⅜ inches in diameter and the other dimensions of the plate and the dimensions of the cap members and fittings being in the proportion shown in the drawings. The heating elements 35 and 36 were made from stainless steel tubing having a diameter of 0.5 inches and a wall thickness of 0.035 inches, the central portions being formed into a generally elliptical cross-sectional shape having an outside horizontal dimension of about 0.625 inches and an outside vertical dimension of about 0.375 inches. The tube 37 is of 0.5 inch stainless steel flexible tubing while the tube 38 is of 0.5 inch tubing either steel or aluminum, preferably aluminum. The end cap members and fittings are of aluminum and the outlet orifice 48 in the fitting 46 has a diameter of 0.420 inches.

EXAMPLE II.

For a General Motors V-eight engine having a cubic inch displacement of from 280–320 cubic inches and a two barrel carburetor, an embodiment of the apparatus 10 having the dimensions as described in Example I was utilized, except that the heating elements were of 7/16 inch stainless tubing with a wall thickness of 0.035 inches, the central portions of elliptical cross-sectional shape having an outside horizontal dimension of about 0.5 inches and an outside vertical dimension of about 0.13 inches, and except that the outlet orifice 48 in the fitting 46 had a diameter of 0.38 inches.

EXAMPLE III.

For a General Motors V-eight engine having a cubic inch displacement of from 350–455 and a four barrel carburetor, an embodiment of the apparatus 10 having an aluminum plate and having a configuration such as that of the plate 66 in FIG. 5 was utilized. The elements 71 and 72 were formed from stainless steel tubing having a diameter of 0.5 inches and a wall thickness of 0.035 inches, the central portions being formed into a generally elliptical cross-sectional shape having an outside horizontal dimension of about 0.625 inches and a vertical outside dimension of about 0.375 inches. Tubes 77 and 78 were of standard 0.5 inch rigid tubes, bent as required or could be 0.5 inch flexible tubing. The fittings 75 and 76 are standard 90 degree elbow fittings, female compression to male, ⅜ inch pipe, except that the outlet orifice in the outlet fitting 76 was drilled out to have a diameter of 0.420 inches.

EXAMPLE IV.

For a General Motors V-eight engine having a cubic inch displacement of from 472–500 and a four barrel carburetor, an embodiment of the apparatus 10 described in Example 3 was utilized, except that the inlet orifice 75a in the outlet fitting 75 was drilled out to have a diameter of 0.510 inches.

EXAMPLE V.

For a six cylinder Ford engine having a cubic inch displacement of 250 and a single barrel carburetor, an embodiment of the apparatus 10 having an aluminum plate and having the size and configuration of the plate 80 in FIG. 5 was utilized, with a heating element 84 being formed of 0.5 inch stainless steel tubing having a wall thickness of 0.035 inches, the central portion being formed into a generally elliptical cross-sectional shape having an outside horizontal dimension of 0.625 inches and a vertical dimension along the order of 0.375 inches. Tube 87 was of 0.5 inch flexible stainless steel tubing and tube 88 was of 0.5 inch flexible tubing either steel or aluminum, preferably aluminum.

EXAMPLE VI.

For an engine as described in Example I, an embodiment of the apparatus 10 having heating elements as described in Example I but mounted in a plate similar to that shown in FIGS. 1–4 was utilized but modified to have slots similar to slots 73 and 74 in the construction of FIG. 5 and with standard 90 degree elbow fittings, female compression to male, ⅜ inch pipe, the outlet orifice 76a in the outlet fitting being drilled out to have a diameter of 0.420 inches.

EXAMPLE VII.

For an engine as described in Example II, an embodiment of the apparatus 10 as described in Example VI was utilized but with the outlet orifice 76a in the outlet fitting not being drilled out, thereby having a standard size of 0.38 inches.

EXAMPLE VIII.

For an engine as described in Example III, an embodiment of the apparatus 10 having heating elements as described in Example III was utilized, but mounted in a plate having cap members such as shown in FIGS. 1–4 for a four barrel carburetor. The outlet orifice 48 in the outlet fitting 46 had a diameter of 0.420 inches.

EXAMPLE IX.

For an engine as described in Example IV, an embodiment of the apparatus 10 as described in Example VIII was utilized, but with the outlet orifice 48 in the outlet fitting 46 having a diameter of 0.510 inches.

In providing for a particular engine which differs from the engines of the foregoing examples, the closest example was selected as a starting point. If the carburetor is different, the shape of the mounting plate must, of course, be modified to fit. The size of the heating element should be approximately proportional to the displacement of the engine and if the displacement of the engine differs substantially from that of the selected example, tubing of a smaller or larger diameter should be used in forming the element or elements. With respect to the size and configuration of the path of flow of exhaust gas, the arrangement of the selected example may be used and the size of the opening in the outlet fitting may be adjusted to obtain optimum flow of exhaust gas and thereby optimum heat. One method of adjustment which has been used successfully is to make road tests with a one gallon tank connected to the carburetor fuel inlet for gravity feed, operating the vehicle in one direction on a highway until the tank is used up, then operating the vehicle in the reverse direction on the same highway until a second tank is used up, ad taking the average from such tests. By performing such tests with openings of different sizes, the optimum size can be determined. Such road tests should be conducted at a constant relatively high speed, such as 55 miles per hour, for example, such that the engine is operated at on the order of at least 40% of maximum speed and 40% of maximum load. When he apparatus is adjusted to obtain optimum fuel economy under such conditions, optimum overall results should be obtained from the standpoint of both improved fuel economy and increased torque and horsepower. Dynomometer tests for torque or horsepower may also be performed under high speed and load conditions. For example, the engine may be operated with the throttle valve fully open and the load may be adjusted to produce a certain speed, the torque or horsepower at such speed being a measure of the engine performace. In either case, whether determined by tests for fuel economy or whether determined by dynomometer tests for torque or horsepower, the optimum size and configuration of the flow path is approximately the same, when the tests are made uner high speed and load conditions.

It is important to note that the tests should be conducted over a range of adjustment such that a maximum point is observed. If the size and configuration of the exhaust gas flow path is proper, a change which either increases or decreases the amount of heat, should produce a decrease in fuel economy and a decrease in torque or horsepower, regardless of whether the change increases or decreases the flow. If such an observable maximum point cannot be obtained from adjusting the size of the opening in the outlet fitting, appropriate adjustments in the overall size and configuration of the flow path should be made. For example, if it is found that performance is improved by increasing the size of the opening but no maximum point is observed when the size is increased to the maximum size possible with the particular size of fittings used, then larger sizes of conduits and fittings should be used. Conversely, if it is found that no maximum point is observed even when the size of the opening is reduced to an extent such that it substantially blocks flow of the exhaust gas, the sizes of the conduits and fittings should be reduced.

In connection with the foregoing early examples, it is noted that in each case, a cubic inch displacement range is specified, and in each case, the results should be optimum at about the mid-point of the specified range, the operation at the upper and lower limits of the specified range being less than optimum but quite satisfactory. From a manufacturing and distribution standpoint, it is desirable to minimize the number of different constructions but, if desired, additional constructions might be provided for operation at only one specified cubic inch displacement or for operation within a narrower range of cubic inch displacements. For example, the arrangements of Examples IV and IX might be limited to engines in a displacement range of from 480 to 500, and additional constructions might be provided having a diameter of 0.500 inches in the outlet fitting, to cover a range of from 430 to 472.

After extensive experiments and numerous tests along the lines described above, some "rule of thumb" relationships were arrived at. These "rule of thumb" relationships are set forth below:

First of all, empirical determinations indicate that exhaust gas should be brought into the apparatus 10 in a 0.560 or 0.625 ± .015 inch I.D. stainless steel flexible conduit or tubing depending on the cubic inch displacement of the engine 11. In this respect 0.560 ± .015 inch I.D. was found suitable for engines having 300 to 400 cubic inch displacement and 0.625 ± .015 inch I.D. was found suitable for engines having 400 to 500 cubic inch displacement. This allows for sufficient exhaust gas to enter the apparatus 10 when the engine speed and resultant exhaust gas pressure are increased.

Further it was found that an aluminum plate 16 or 66 is preferred because the plate, perhaps because of its conductivity, stays cooler than the stainless steel tubular elements.

As the butterfly throttle valve opens, the fuel flows down the lower portion of the center of the throttle valve in a path approximately $\frac{1}{4}$ to $\frac{3}{8}$ of an inch wide. Thus, it has been empirically determined that the elements should have at last a 0.375 inch O.D. and should be located centrally of the barrel such as on a diameter thereof.

Additionally, a $\frac{1}{4}$ inch gasket 19 situated between the top of the plate and the carburetor to insulate the carburetor from the heat of the apparatus 10 has been found to be very suitable. In this respect, it is believed that the best results are obtained when the fuel in the carburetor is kept as cool as possible, but then heated after leaving the carburetor.

With the construction and arrangement of the parts of the apparatus as described above and with the apparatus 10 having the dimensions, relationships and parameters described above and below, the apparatus 10 provides for the heating and vaporizing of most of the fuel hitting or passing close by the tubular elements with very little air being heated by the tubular elements.

As stated above, in arriving at dimensional parameters, certain "rule of thumb" relationships were arrived at empirically after numerous tests. For example, the desired inlet orifice diameter for inlet orifice 37a or 75a has been determined to be 0.560 or 0.625 inch I.D., depending on the cubic inch displacement of the cylinders.

Also, a desired outer diameter of the tubular elements, 35, 36 or 71, 72, has been found to be related to the size of the barrels. Thus, it has been found that a workable "rule of thumb" relationship is to provide an element outer diameter or width transverse to the flow of fuel and air which is equal to 10% of the circumference of the barrel diameter ± 0.062 inch.

In one example, for an internal combustion engine with 320 cubic inch displacement and a two barrel carburetor having barrel diameters of 1.445 inches, the outer diameter dimension was determined as follows:

$$(0.010) \times (1.445) \times (3.1416) = 0.453$$

Since a ⅜ inch tubular element provides 0.437 inch, a ⅜ inch tubular element was used. Also, to take care of the difference of 0.016 (i.e., 0.453–0.437), per element, this dimension (0.032 for two tubular elements) can be added to the diameter of the outlet orifice.

Again, after numerous tests, it was determined that a workble "rule of thumb" formula for determining the outlet orifice diameter dimension is to multiply the cubic inch displacement of the engine by 0.00105 and providing a tolerance of ± 0.015 inch.

Thus, for the above example of a 320 cubic inch displacement engine the outlet orifice is calculated at:

$$(0.00105) \times (320) = 0.336 \pm 0.15 \text{ inch}$$

Since a ⅜ inch tubing was used leaving 0.016 inch per barrel 0.032 was added to 0.336 yielding 0.368. Using a standard drill bit, outlet orifice 48 or 76a was then drilled out so as to have 0.375 to 0.380 inch diameter.

Using the above rule of thumb relationships and by either flattening the tubular elements to an elliptical shape to increase width or by increasing the outlet orifice to make up for differences in calculated and commercially available diameters of tubular elements, the following parameters have been worked out and developed for a number of standard internal combustion engines:

| Cubic Inch Displacement | Barrels | Barrel Aperture Diameter | Inlet Orifice + .015 inch | Outlet Orifice ±.015 inch | Width Of Tubular Element ± .062 inch |
|---|---|---|---|---|---|
| 300 (using ⅜ inch tubing) | 2 | 1.445 | .560 .560 | .315 .347 | .453 .437 |
| 320 (using ⅜ inch tubing) | 2 | 1.445 | .560 .500 | .336 .368 | .453 .437 |
| 350 (using ½ inch tubing flattened to .540) | 2 | 1.710 | .560 .560 | .367 .367 | .537 .540 |
| 400 (using ½ inch tubing falttened to .540) | 2 | 1.710 | .560 .560 | .420 .420 | .537 .540 |
| 455 (using ½ inch tubing flattened to .625) | 4 | 2.0* | .625 | .478 | .628 .625 |
| 472 | 4 | 2.0* | .625 | .495 | .625 (½" flattened) |
| 500 | 4 | 2.0* | .625 | .525 | (½" flattened) |

*1.5 inch with 0.50 inch cutaway between primary and secondary barrels yielding 2.0 inch.

It is also noted that it is possible to adjust the size of the exhaust gas flow path at points other than in the opening of the outlet fitting, although such adjustment has been found to be easy to perform and highly satisfactory.

It is also possible that an adjustable opening might be provided in the outlet fitting or at some other point in the path, especially for the purpose of determining the optimum size. Providing an adjustable device subject to misuse by the user should generally be avoided, however.

It will be understood that modifications and variations may be effected to the apparatus 10 without departing from the teachings of the present invention. Accordingly, the scope of the present invention is only to be limited as necessitated by the accompanying claims.

I claim:

1. For use with a carburetor of an internal combustion engine having at least two generally circular barrels, an apparatus for vaporizing fuel in an air-fuel mixture, said apparatus comprising, a plate adapted to be mounted between a carburetor and openings in the intake manifold of the engine, said plate having at least two passages which mate with and align with the barrels of the carburetor and the manifold openings, heating means for heating fuel flowing through said passages, insulating means between said plate and the carburetor, said heating means including two tubular elements, each element extending across one of said passages generally along a diameter of the said passage and transverse to the axis of rotation of a butterfly throttle valve of the carburetor, each said element having a predetermined width transverse to the flow of fuel and air, inlet flow control means coupled to respective first ends of said elements, outlet flow control means coupled to respective second ends of said elements and venting to atmosphere, said inlet flow control means having a first gas flow constricting orifice of predetermined area, said outlet flow control means having a second gas flow constricting orifice of predetermined area less than the area of said first constricting orifice, and the construction, arrangement and dimensions of said elements, said first orifice and said second orifice providing for efficient and effective vaporization of the fuel with minimal heating of the air.

2. The apparatus according to claim 1 wherein, for internal combustion engines having from 300 to 400 cubic inch displacement, the first gas flow constricting orifice is a circular orifice having a diameter of 0.560 ± 0.015 inch.

3. The apparatus according to claim 1 wherein, for internal combustion engines having from 400 to 500 cubic inch displacement, the first flow constricting orifice is a circular orifice having a diameter of 0.625 ± 0.015 inch.

4. The apparatus according to claim 1 wherein said predetermined width of each of said elements is at least 0.375 inch.

5. The apparatus according to claim 1 wherein said predetermined width of each of said elements is caused to approach 10% of the circumference of the carburetor barrel ± 0.062 inch.

6. The apparatus according to claim 1 wherein said second flow constricting orifice is generally circular and has a diameter which is caused to approach (0.00105) × (cubic inch displacement of the engine) ± 0.015 inch.

7. The apparatus according to claim 1 wherein each of said elements is flattened slightly so as to have an elipsoidal cross section with the longest axis of the ellipse being transverse to the flow path of the fuel and air thereby to provide a surface which is more transverse than axial to the fuel and air path.

8. The apparatus according to claim 1 wherein said insulating means is a ¼ inch gasket having low heat conductivity.

9. The apparatus according to claim 1 for use with an internal combustion engine having 300 cubic inch displacement and a two barrel carburetor with barrel diameters of 1.445 inches, wherein said first orifice is generally cylindrical and has a diameter of 0.560 ± 0.015 inch, said second orifice is generally cylindrical and has a diameter of 0.315 ± 0.015 inch and said predetermined width of each of said tubular elements is 0.453 ± 0.062 inch.

10. The apparatus according to claim 1 for use with an internal combustion engine having 300 cubic inch displacement and a two barrel carburetor with barrel diameters of 1.445 inches, wherein said first orifice is generally cylindrical and has a diameter of 0.560 ± 0.015 inch, said second orifice is generally cylindrical and has a diameter of 0.347 ± 0.015 inch and said predetermined width of each said tubular elements is 0.437 ± 0.062 inch.

11. The apparatus according to claim 1 for use with an internal combustion engine having 320 cubic inch displacement and a two barrel carburetor with barrel diameters of 1.445 inches, wherein said first orifice is generally cylindrical and has a diameter of 0.560 ± 0.015 inch, said second orifice is generally cylindrical and has a diameter of 0.336 ± 0.015 inch and said predetermined width of each of said tubular elements is 0.453 ± 0.062 inch.

12. The apparatus according to claim 1, for use with an internal combustion engine having 320 cubic inch displacement and a two barrel carburetor with barrel diameters of 1.445 inches wherein said first orifice is generally cylindrical and has a diameter of 0.560 ± 0.015 inch, said second orifice is generally cylindrical and has a diameter of 0.368 ± 0.015 inch and said predetermined width of each of said tubular elements is 0.437 ± 0.062 inch.

13. The apparatus according to claim 1, for use with an internal combustion engine having 350 cubic inch displacement and a two barrel carburetor with barrel diameters of 1.710 inches, wherein said first orifice is generally cylindrical and has a diameter of 0-560 ± 0.015 inch, said second orifice is generally cylindrical and has a diameter of 0.367 ± 0.015 inch annd said predetermined width of each of said tubular elements is 0.537 ± 0.062 inch.

14. The apparatus according to claim 1, for use with an internal combustion engine having 350 cubic inch displacement and a two barrel carburetor with barrel diameters of 1.710 inches, wherein said first orifice is generally cylindrical and has a diameter of 0.560 ± 0.015 inch, said second orifice is generally cylindrical and has a diameter of 0.367 ± 0.015 inch, and said predetermined width of each of said tubular elements is 0.540 ± 0.062 inch, each said element being formed from ⅛ inch tubing which is flattened to an elipsoidal shape with a transverse extent of 0.540 ± 0.062 inch normal to the flow of the air-fuel mixture.

15. The apparatus according to claim 1, for use with an internal combustion engine having 400 cubic inch displacement and a two barrel carburetor with barrel diameters of 1.710 inches, wherein said first orifice is generally cylindrical and has a diameter of 0.560 ± 0.015 inch, said second orifice is generally cylindricial and has a diameter of 0.420 ± 0.015 inch, and said predetermined width of each of said tubular elements is 0.537 ± 0.062 inch.

16. The apparatus according to claim 1, for use with an internal combustion engine having 400 cubic inch displacement and a two barrel carburetor with barrel diameters of 1.710 inch, wherein said first orifice is generally cylindrical and has a diameter of 0.560 ± 0.015 inch, said second orifice is generally cylindrical and has a diameter of 0.420 ± 0.015 inch, and said predetermined width of each of said tubular elements is 0.540 ± 0.062 inch, each said element being formed from ⅛ inch tubing which is flattened to an elipsoidal shape with a transverse extent of 0.540 ± 0.62 inch normal to the flow of the air-fuel mixture.

17. The apparatus according to claim 1, for use with an internal combustion engine having 455 cubic inch displacement and a four barrel carburetor with effective primary barrel diameters of 2.0 inches per barrel defined by two 1.5 inch primary barrels with 0.50 inch cutaway between each pair of primary and secondary barrels, wherein said first orifice if generally cylindrical and has a diameter of 0.625 ± 0.015 inch, said second orifice is generally cylindrical and has a diameter of 0.478 ± 0.015 inch, and said predetermined width of each of said tubular elements is 0.628 ± 0.062 inch.

18. The apparatus according to claim 1, for use with an internal combustion engine having 455 cubic inch displacement and a four barrel carburetor with effective primary barrel diameters of 2.0 inches per barrel defined by two 1.5 inch primary barrels with 0.50 inch cutaway between each pair of primary and secondary barrels, wherein said first orifice is generally cylindrical and has a diameter of 0.625 ± 0.015 inch, said second orifice is generally cylindrical and has a diameter of 0.478 ± 0.015 inch, and said predetermined width of each of said tubular elements is 0.625 ± 0.062 inch, each said element being formed from ⅛ inch tubing which is flattened to an elipsoidal shape with a transverse extent of 0.625 ± 0.062 inch normal to the flow of the air-fuel mixture.

19. The apparatus according to claim 1, for use with an internal combustion engine having 472 cubic inch displacement and a four barrel carburetor with effective primary barrel diameters of 2.0 inches per barrel defined by two 1.5 inch primary barrels with 0.50 inch cutaway between each pair of primary and secondary barrels, wherein said first orifice is generally cylindrical and has a diameter of 0.625 ± 0.016 inch, said second orifice is generally cylindrical and has a diameter of 0.495 ± 0.015 inch, and said predetermined width of each of said tubular elements is 0.625 ± 0.062 inch, each said element being formed from ⅛ inch tubing which is flattened to an elipsoidal shape with a transverse extent of 0.625 ± 0.062 inch normal to the flow of the air-fuel mixture.

20. The apparatus according to claim 1, for use with an internal combustion engine having 500 cubic inch displacement and a four barrel carburetor with effective primary barrel diameters of 2.0 inches per barrel defined by two 1.5 inch primary barrels with a 0.50 inch cutaway between each pair of primary and secondary barrels, wherein said first orifice is generally cylindrical and has a diameter of 0.625 ± 0.015 inch, said second orifice is generally cylindrical and has a diameter of 0.525 ± 0.015 inch, and said predetermined width of each of said tubular elements is 0.625 ± 0.062 inch, each said element being formed from ⅛ inch tubing which is lattened to an elipsoidal shape with a transverse extent of 0.625 ± 0.062 inch normal to the flow of the air-fuel mixture.

21. The apparatus according to claim 1 wherein said plate is made of aluminum and said tubular elements are made of stainless steel.

22. The apparatus according to claim 1 wherein each tubular element extends across a passage in said plate in parallel spaced relationship to the other said tubular element extending across the other passage in said plate.

23. The apparatus according to claim 1 wherein hot exhaust gases are supplied to the end of each tubular element which is closest to the opening side of the butterfly throttle valve thereby to ensure that fuel droplets in the air-fuel mixture will impinge upon or pass in close proximity to the hottest part of each tubular element.

* * * * *

UNITED STATES PATENT OFFICE
CERTIFICATE OF CORRECTION

PATENT NO. : 4,137,881
DATED     : February 6, 1979
INVENTOR(S) : WILMER C. JORDAN It is certified that error appears in the above-identified patent and that said Letters Patent are hereby corrected as shown below:

Column 6, line 20 "plae" should be --place--.

Column 11, line 21 "ad" should be --and--.

line 28 "he" should be --the--.

line 42 "uner" should be --under--.

Column 13, line 6 "5/8" should be --7/8--; "5/8" should be --7/8-- line 13 "workble" should be --workable--.

line 20 "5/8" should be --7/8--.

line 49 "falttened" should be --flattened--.

line 56 before "(1/2" flattened)" add --.625--.

Column 15, line 41 "0-560" should be --0.560--.

line 43 "annd" should be --and--.

line 55 "1/8" should be --1/2--.

Column 16, line 9 "0.62" should be --0.062--.

line 17 "if" should be --is--.

Signed and Sealed this

Fourteenth Day of August 1979

[SEAL]

Attest:

LUTRELLE F. PARKER

*Attesting Officer*     *Acting Commissioner of Patents and Trademarks*